United States Patent [19]

Gundlach

[11] Patent Number: 5,534,050
[45] Date of Patent: Jul. 9, 1996

[54] THERMAL INK JET COMPOSITION

[75] Inventor: Kurt B. Gundlach, Pittsford, N.Y.

[73] Assignee: Xerox Corporation, Stamford, Conn.

[21] Appl. No.: 450,075

[22] Filed: May 25, 1995

[51] Int. Cl.$^6$ ............................................. C09D 11/02
[52] U.S. Cl. ..................................... 106/20 R; 106/22 R
[58] Field of Search .................................. 106/20 R, 22 R

[56] References Cited

U.S. PATENT DOCUMENTS

| | | | |
|---|---|---|---|
| 4,026,713 | 3/1977 | Sambucetti et al. | 106/20 B |
| 4,153,593 | 5/1979 | Zabiak et al. | 106/22 B |
| 4,299,630 | 11/1981 | Hwang | 106/22 H |
| 4,383,859 | 5/1983 | Moore et al. | 106/22 B |
| 4,400,216 | 8/1983 | Arora | 106/20 R |
| 4,508,570 | 4/1985 | Fuji et al. | 106/22 R |
| 4,623,689 | 11/1986 | Shintani et al. | 524/457 |
| 4,627,876 | 12/1986 | Fries et al. | 106/27 R |
| 4,914,562 | 4/1990 | Abe et al. | 346/140 R |
| 5,019,166 | 5/1991 | Schwarz | 106/22 R |
| 5,106,416 | 4/1992 | Moffatt et al. | 106/20 D |
| 5,116,409 | 5/1992 | Moffatt et al. | 106/22 R |
| 5,118,350 | 6/1992 | Prasad | 106/22 R |
| 5,141,556 | 8/1992 | Matrick | 106/22 R |
| 5,143,547 | 9/1992 | Kappele | 106/22 R |
| 5,145,519 | 9/1992 | Kappele | 106/22 R |
| 5,160,372 | 11/1992 | Matrick | 106/19 D |
| 5,183,502 | 2/1993 | Meichsner et al. | 106/20 D |
| 5,196,056 | 3/1993 | Prasad | 106/20 D |
| 5,226,957 | 7/1993 | Wickramanayake et al. | 106/22 F |
| 5,254,159 | 10/1993 | Gundlach et al. | 106/22 H |
| 5,273,573 | 12/1993 | Kappele | 106/22 R |

*Primary Examiner*—Helene Klemanski
*Attorney, Agent, or Firm*—Oliff & Berridge

[57] ABSTRACT

A thermal ink jet printing composition contains an acetylenic polyalkylene oxide and a quasisurfactant penetrant.

16 Claims, No Drawings

THERMAL INK JET COMPOSITION

BACKGROUND OF THE INVENTION

The invention relates to a thermal ink jet composition, a printing process and a method of improving the fast dry characteristics of inks.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or to a specific location on a recording medium. In drop-on-demand systems, a droplet is expelled from an orifice directly to a position on a recording medium in accordance with digital data signals. A droplet is not formed or expelled unless it is to be placed on the recording medium.

Quality thermal ink jet printing can be achieved by utilizing an aqueous ink composition containing at least one dye or pigment, a wetting agent and water. U.S. Pat. No. 4,508,570 to Fujii et al., discloses an aqueous ink for ink jet printing, which comprises a water-soluble direct dye and/or acid dye, a polyhydric alcohol and/or an alkyl ether thereof, water, and at least one water-soluble non-ionic surface active agent selected from a specified polyoxyethylene alkyl amine, a specified polyoxyethylene alkyl phenyl ether and a specified polyoxyethylene alkyl ether. U.S. Pat. No. 4,623,689 to Shintani et al., discloses an ink jet ink containing aqueous colored polymers, which comprise a homopolymer of an ethylenically unsaturated sulfonic acid or its salt or a copolymer of an ethylenically unsaturated sulfonic acid or its salt with another ethylenically unsaturated monomer, wherein the homopolymer or copolymer is dyed with a basic dye and has a lowest film-forming temperature of not higher than 35° C. U.S. Pat. No. 4,627,876 to Fries et al., discloses a printing ink containing a pigment and an alkyd resin binder. The resin binder is modified with fatty acids. The alkyd resin is the reaction product of (a) a fatty acid, triglyceride of a fatty acid or a mixture of fatty acids, (b) a polyol, (c) an epoxy resin and (d) a dicarboxylic acid.

U.S. Pat. No. 4,026,713 to Sambucetti et al. relates to a magnetic ink containing non-ionic, cationic and/or anionic surfactants. The surfactants may include glycerol, a lower alkyl monoether of ethylene glycol and/or a polyethylene diol.

U.S. Pat. No. 4,914,562 to Abe et al. discloses an ink jet composition containing an ionic surface active agent or a non-ionic surface active agent. The ionic surface active agent can be a dioctyl sulfosuccinate sodium salt, sodium oleate or dodecylbenzenesulfonic acid. The non-ionic surface active agent may be diethylene glycol mono-n-butyl ether or triethylene glycol mono-n-butyl ether.

U.S. Pat. No. 5,019,166 to Schwarz relates to a thermal ink jet printing composition comprising a dye, a liquid medium and a surfactant selected from the group consisting of polyoxyalkylated ethers, anionic bitail fluorothio alkyls, alkyl aryl sulfonates, alkyl amine quaternary salts and mixtures thereof.

U.S. Pat. No. 5,116,409 to Moffatt discloses a process for reducing color bleed of inks employed in thermal ink jet printing. The process comprises printing two inks side by side, each ink having a composition comprising (a) a vehicle and (b) about 0.1 to 10 wt. % of at least one water-soluble anionic dye. The vehicle comprises at least one member selected from the group consisting of zwitterionic surfactants and non-ionic amphiphiles and water or water and an organic solvent. Moffatt discloses a composition that includes SURFYNOL S465, an acetylenic polyethylene oxide, and 1,5-pentanediol.

U.S. Pat. No. 5,254,159 to Gundlach et al. discloses an ink composition that comprises water, an anionic dye and an amine compound. The ink composition provides waterfast images. The disclosure of this patent is incorporated in its entirety herein by reference.

Full color printing in a thermal ink jet printing process requires an ink with fast dry characteristics. Fast dry characteristics can be improved by the addition of a penetrant. The penetrant can be a quasisurfactant penetrant. For the purposes of this invention, a quasisurfactant penetrant is a surfactant that is substituted with a polar substituent toward one end of a chain of 4–8 aliphatic carbon atoms. Exemplary penetrants include dl-1,2-hexanediol, 1,2-octanediol, diethylene glycol monobutyether, 1-cyclohexyl-2-pyrrolidinone, 2-methyl-2-propyl-1,3-propanediol and 1-butanesulfonic acid sodium salt.

A penetrant imparts quick-dry characteristics to a thermal ink jet ink composition. However, effectiveness of a penetrant in providing quick-dry characteristics varies with ink composition solvent. Some penetrants do not provide acceptable quick-dry characteristics to some ink-solvent systems. Cosolvents can be added to ink compositions to improve effectiveness of the surfactant penetrant or penetrant concentration in the ink compositions can be increased to achieve satisfactory quick-dry characteristics. However, some cosolvent packages and/or higher penetrant concentrations cause deterioration of thermal ink jet hardware. For example, higher loads of butylcarbitol or higher loads of cyclohexyl pyrrolidinone aggressively attack cartridge materials and seals.

SUMMARY OF THE INVENTION

The present invention relates to an improved thermal ink jet printing composition containing a surfactant comprising an acetylenic polyalkylene oxide and a quasisurfactant penetrant.

The combination of an acetylenic polyethylene glycol with a quasisurfactant penetrant provides a universally applicable surfactant package. The use of either surfactant alone does not provide an ink with the fast dry characteristics that are required for full color thermal ink jet printing. Unexpectedly, the combination of an acetylenic polyethylene oxide and a quasisurfactant penetrant results in an ink that gives acceptable rapid dry characteristics. Additionally, the combination unexpectedly provides rapid dry characteristics independent of the ink vehicle co-solvent. Fast dry, full color ink sets can be provided by the present invention without high loads of additives that deteriorate thermal ink jet hardware materials.

The present invention also relates to a thermal ink jet printing process comprising causing an ink jet composition comprising an acetylenic polyethylene oxide and a quasisurfactant penetrant to be injected in an image wise fashion from a thermal ink jet printer onto a substrate.

Finally, the present invention is directed to a method of improving fast dry characteristics of thermal ink jet inks comprising incorporating into a thermal ink jet composition, a combination of an acetylenic polyethylene oxide and a quasisurfactant penetrant.

DETAILED DESCRIPTION OF PREFERRED EMBODIMENTS

Inks of the present invention comprise a dye colorant. Generally, any effective dye, such as one of the direct dyes or the acid dyes, may be selected, provided that the dye is compatible with the other ink components and is soluble in the liquid medium.

Examples of suitable dyes include Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GFT Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company; Spirit Fast Yellow 3G; Aizen Spilon Yellow C-GNH (Hodagya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Severon Blue 5GMF (ICI); Basacid Blue 750 (BASF); and the like. Typical preferred dyes include Bernacid Red, available from Berncolors, Poughkeepsie, N.Y., Pontamine Brilliant Bond Blue, Berncolor A. Y. 34, Basacid Black X34, Carta Black 2 GT, Telon Fast Yellow 4GL-175, and the Like. The dye is generally present in the ink composition in an effective amount, generally from about 0.5 to about 8 percent by weight, and preferably from about 1 to about 6 percent by weight.

The inks of the present invention also include a liquid medium. Frequently, water comprises the major portion of the liquid medium and, while it may comprise 100 percent of the liquid medium, water is generally present in an amount of from about 7 to about 93 percent by weight of the ink, and preferably from about 55 to about 85 percent by weight of the ink.

Preferably, the inks of the present invention also contain a humectant such as a glycol, including ethylene glycol, propylene glycol, other glycols, or other known humectants as part of the liquid medium. When present, the humectant is present in an effective amount, generally from about 5 to about 60 percent by weight, preferably from about 10 to about 20 percent by weight, and most preferably at about 17 percent by weight. Any other suitable liquid medium can also be employed provided that the objectives of the present invention are achieved.

Optionally, the ink composition can include a biocide such as sorbic acid, 1-(3-chloroallyl)-3,5,7-triaza-1-azoniaadamantane chloride, commercially available as Dowicil 200 (Dow Chemical Company, Midland, Mich.), vinylenebis thiocyanate, commercially available as Dowicil 200 (Dow Chemical Company, Midland, Mich.), vinylene-bis thiocyanate, commercially available as Cytox 3711 (American Cyanamid Company, Wayne, N.J.), disodium ethylenebisdithiocarbamate, commercially available as Dithone D14 (Rohm & Haas Company, Philadelphia, Pa.), bis-(trichloromethyl) sulfone, commercially available as Biocide N-1386 (Stauffer Chemical Company, Westport, Conn.), zinc pyridinethione, commercially available as zinc omadine (Olin Corporation Stamford, Conn.), 2-bromo-t-nitropropane-1,3-diol, commercially available as onyxide 500 (Onyx Chemical Company, Jersey City, N.J.), Bosquat MB50 (Louza, Inc., Fairtown, N.J.) and the like may be present in the inks of the present invention. When present the biocide is in an effective amount, generally from about 0.01 to about 1 percent by weight, and preferably from about 0.1 to about 0.5 percent by weight.

The surfactant of the present invention comprises an acetylenic polyalkylene oxide and a quasisurfactant penetrant. The alkylene groups of the acetylenic polyalkylene oxides have two to four carbon atoms. Preferably the acetylenic polyalkylene oxides are acetylenic polyethylene oxides. The preferred acetylenic polyethylene oxides are ethoxylated tetramethyl decynediols such as the Surfynols manufactured by Air Products and Chemicals Inc. The Surfynols are represented as

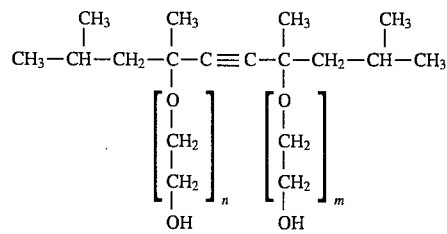

where n+m=0 to 50.

Effectiveness of penetrants in providing quick-dry characteristics varies with ink composition solvent. Significantly high loads of solvents such as butylcarbitol or cyclohexyl pyrrolidinone are usually required in order to achieve satisfactory high dry times for competitive thermal jet inks. Such solvent/penetrant systems aggressively attack hardware of an ink jet printer including the cartridge materials and seals. The present invention provides a surfactant comprising the combination of an acetylenic polyethylene oxide and a quasisurfactant penetrant that permits a surfactant load as low as 2.5 wt. %. Even at such low weight percent loads, thermal ink jet inks according to the present invention provide fast-dry characteristics. Additionally, the fast-dry characteristics obtained by the combination of surfactants of the invention are independent of the solvent selected for the ink.

Additional advantages of the combination surfactant of the present invention include improved solid area covering quality, elimination of decapped front face ink cartridge "weep" and improved print cartridge decapped print recoverability. Decapped face ink "weep" can occur when a print cartridge is left open and ink floods out of nozzles onto the cartridge front face plate. In one test for "weep," a cartridge is removed from a printer and the front face of the cartridge is cleaned with a vacuum wand. The cartridge is then permitted to set uncapped to evaporate ink from nozzle orifices. "Weep" occurs when the ink does not evaporate but rather oozes from nozzles and forms a crystalline ink deposit on the cartridge front face. "Decapped recoverability" describes the quality of print provided after the cartridge is replaced into the printer. Immediate recoverability means that the cartridge immediately begins to print clearly in acceptable quality.

Ethylene glycol, trimethylol propane, sulfolane, n-methylpyrrolidinone, thiodiethanol and glycerine have been found to be suitable cosolvents with the combination surfactant of the present invention. The ink jet inks of the present invention can comprise 0.1 to 2 wt. % acetylenic polyalkylene oxide and 0.2 to 8 wt. % quasisurfactant penetrant. Preferably the compositions contain 0.2 to 1 wt. % acetylenic polyalkylene oxide and 0.5 to 5 wt. % quasisurfactant penetrant. Most preferred is a composition containing 0.3 to 0.6 wt. % acetylenic polyalkylene oxide and 1 to 4 wt. % 1,2-hexanediol.

The ink compositions of the present invention are of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of ingredients. One process entails mixing all of the ink ingredients together and filtering the mixture to obtain an ink. The inks of the present invention can be prepared by mixing ingredients, heating if desired, and filtering, followed by adding the acetylenic polyethylene oxide and quasisurfactant penetrant of the present invention to the mixture and mixing at room temperature with moderate shaking until a homogeneous mixture is obtained, typically from about 5 to about 10 minutes. Alternatively, the acetylenic polyethylene oxide and quasisurfactant penetrant of the present invention can be mixed with the other ink ingredients during the ink preparation process.

Ink pH is adjusted to a desired level at some time during the preparation process; typically, pH adjustment occurs subsequent to most of the other ink preparation steps by addition of an acid and a buffer, and preferably the pH adjustment occurs prior to filtration so that any solid precipitates generated by pH adjustment can be removed from the ink during the filtration step.

The present invention is also directed to a process that comprises incorporating an ink composition of the present invention into an ink jet printing apparatus and causing droplets of the ink composition to be ejected in an imagewise pattern onto a substrate. In an embodiment of the invention, the printing apparatus employs a thermal ink jet process wherein the ink in nozzles is selectively heated thereby causing droplets of the ink to be ejected in an imagewise pattern.

The printing process of the invention can be employed on any suitable substrate, including plain papers such as Xerox® 4024 papers, ruled notebook paper, bond paper, silica coated papers such as Sharp Company silica coated paper, JuJo paper, and the like, transparency materials, fabrics, textile products, plastic, polymeric films and inorganic substrates such as metals and wood, and the like. In one embodiment, the process comprises printing onto a porous or ink absorbent substrate, such as plain paper.

The invention will further be illustrated in the following, non-limiting examples, it being understood that these examples are intended to be illustrative only and that the invention is not intended to be limited to the materials, conditions, process parameters and the like recited therein.

EXAMPLE 1

In a bottle, are mixed 129.63 grams of deionized water, 40 grams of ethylene glycol, 4 grams of dl-1-2-hexanediol and 0.0603 gram of a polyethylene oxide/bisphenol A adduct. 0.195 grams of Dowicil is added to the mixture and the bottle is placed on a roll mill for 10 minutes. Thereafter, 4.01 grams of triethanolamine (from Aldrich Chemical Co.) is added to the bottle and the pH is adjusted to 7.5 with a 70% solution of $H_3PO_3$. Thereafter, 1.12 grams of Neolan Red EXB (C.J. Acid Red 52) and 4.52 grams of Duasyn Brilliant Red F38-SF VP218 (Reactive Red 180) are added to the bottle and the bottle is again placed on the roll mill for 30 minutes.

Dry time of the resulting ink is determined by a wire wand bar draw down test. A wand with a wrapped no. 6 wire saturated with ink composition is drawn down a paper to deposit ink. A standard wire wand draw down test indicates a satisfactory dry time of 35 seconds for the deposited ink prepared in this Example.

SURFYNOL 440 surfactant (ethoxylated tetramethyl decynediol), 0.99 grams, is added to the ink and pH is adjusted to 7.6. The total weight of the ink composition is 185.23 grams. 14.77 grams of deionized water is added to bring the weight to 200 grams and the ink is roll milled for an additional 10 minutes. Filter time of the ink composition with a 0.2 micron ink filter at 60 psi pressure is 330 seconds. The ink produces a vigorous bubble and the filter is clean. 50 grams of the ink is loaded into a Korvel print cartridge and the cartridge is placed in a Xerox printer, XPP4004. In operation, the printer immediately prints clear characters. Print dry time as tested on Cortland 4024DP felt paper is 0.5 seconds. After printing, the print cartridge is removed, decapped and set uncapped for a period of one day. No ink weep is noted. All jets of the print cartridge immediately print when the cartridge is replaced into the Xerox printer XP4004. The ink is tested for flow on a Xerox thermal ink jet transparency. The ink provides good solid area coverage on the transparency. Only slight curl is noted of an air dried solid print area.

The ink composition, method of preparing the composition and test results are summarized in Table 1.

TABLE I

| INGREDIENT/DESCRIPTION | VENDOR | AMOUNT (GM) | SOL N % | MOLE EQV |
| --- | --- | --- | --- | --- |
| WATER | 103 | 129.63 | NA | |
| ETHYLENE GLYCOL | PETROCHEM | 40 | 20 | |
| DL-1,2-HEXANEDIOL | ALDRICH | 4 | 2 | |
| PEO | POLYSCIENCE | 0.0603 | 0.03 | NA |
| DOWICIL, ROLL MILL 10 MINUTES, HOMOGENEOUS | DOW | 0.1995 | 0.1 | |
| TRIETHANOLAMINE (TEA) | ALDRICH | 4.01 | 2 | |
| pH = 9.94, 70% H3PO3 pH = 7.50 | RHONE POULENC | 1.11 | | |
| NEOLAN RED EXB (C.J. ACID RED 52) | CIBA-GEIGY | 1.12 | 0.6 | |
| DUASYN BRILLIANT RED F38-SF VP218 (REACTIVE RED 180) | HEOSCHT | 4.52 | 2.25 | 1 |
| ROLL MILL 30 MINUTES, LOW FOAM | NA | NA | NA | NA |

TABLE I-continued

| INGREDIENT/DESCRIPTION | VENDOR | AMOUNT (GM) | SOL N % | MOLE EQV |
|---|---|---|---|---|
| #6 WWB DRAW DOWN ON DRY TIME = 35 SECONDS | NA | NA | NA | NA |
| SURFYNOL 440 SURFACTANT (ETHOXYLATED TETRAMETHYL DECYNEDIOL) | AIR PRODUCTS | 0.99 | 0.5 | |
| pH = 7.60 | NA | NA | NA | NA |
| INK WEIGHT = 185.23 GM, RO WATER TO 200 GM INK, ROLL MILL 10 MIN | 103 | 14.77 | | |
| HOMOGENEOUS, FILTER 0.2 | NA | NA | NA | NA |

200 GM INK FILTER TIME 0.2 MICRON 60 PSI = 330 SECONDS, VIGOROUS BUBBLE, CLEAN FILTER.
LOADED KORBEL PRINT CARTRIDGE WITH 50 GM INK IMMEDIATELY PRINTED IN XPP4004.
XPP4004 DRY TIME ON COURTLAND FELT = 0.5 SECONDS.
RECOVERABILITY AFTER 1 DAY DECAPPED THEN IN XPP4004 BIPASSING LOAD PRIME = IMMEDIATE ALL JETS. NO INK WEEP NOTED.
GOOD SOLID AREA COVERAGE ON XEROX TRANSPARENCY; SLIGHT CURL OF AIR DRIED SOLID AREA PRINT.

COMPARATIVE EXAMPLES

Four inks are prepared according to the procedure of Example I The inks contain 20 wt. % ethylene glycol. A first ink is prepared without penetrant. A second ethylene glycol ink is prepared with a 2 wt. % load of 1,2-hexanediol. A third ink is prepared containing SURFYNOL 440 (ethoxylated tetramethyl decynediol by Air Products and Chemicals Inc). A fourth ink is prepared containing both 1,2-hexanediol and SURFYNOL 440.

The 20 wt. % ethylene glycol ink exhibits a dry time on Courtland 4024 paper of 120 seconds. When a 2 wt. % load of 1,2-hexanediol is added, dry time drops to 35 seconds. The addition of SURFYNOL 440 to the ethylene glycol ink reduces dry time to 3 seconds. Higher loadings of either the 1,2-hexanediol alone or the ethoxylated tetramethyl decynediol alone do not yield an ink with a dry time under 1 second. However, a combination of 2 wt. % of 1,2-hexanediol with 0.5 wt. % of ethoxylated tetramethyl decynediol in a 20 wt. % ethylene glycol system results in an ink that exhibits a dry time of 0.5 seconds on Courtland 2040DP paper.

EXAMPLES II–IX

Ink compositions are prepared according to the descriptions in the following Tables II–IX. The compositions are tested for filter time, dry time, decap recoverability and transparency coverage with the results as summarized after each table. In the tables RO Water is deionized water, GM is grams and PEO is a polyethylene oxide/bisphenol A adduct.

TABLE II

| INGREDIENT/DESCRIPTION | VENDOR | AMOUNT (GM) | SOL N % | MOLE EQV |
|---|---|---|---|---|
| N-METHYLPYRROLIDINONE | BASF | 14.04 | 7 | |
| DL-1,2-HEXANEDIOL | ALDRICH | 4 | 2 | |
| SURFYNOL 440 SURFACTANT (ETHOXYLATED TETRAMETHYL DECYNEDIOL) | AIR PRODUCTS | 1.03 | 0.5 | |
| SWIRL TO MIX ORGANICS, RO WATER | 103 | 159.62 | | NA |
| PEO | POLYSCIENCE | 0.0597 | 0.03 | NA |
| DOWICIL, ROLL MILL 10 MINUTES, HOMOGENEOUS | DOW | 0.2005 | 0.1 | |
| TRIETHANOLAMINE (TEA) | ALDRICH | 4 | 2 | |
| pH = 0.68, 70% H3PO3 pH = 7.51 | RHONE POULENC | 1.08 | | |
| NEOLAN RED EXB (C.J. ACID RED 52) | CIBA-GEIGY | 1.12 | 0.6 | |
| DUASYN BRILLIANT RED F38-SF VP218 (REACTIVE RED 180) | HEOSCHT | 4.51 | 2.25 | 1 |
| ROLL MILL 30 MINUTES, LOW FOAM | NA | NA | NA | NA |
| pH = 7.61 | NA | NA | NA | NA |
| INK WEIGHT = 189.41 GM, RO WATER TO 200 GM INK, ROLL MILL 10 MIN | 103 | 10.59 | | |
| HOMOGENEOUS, FILTER 0.2 | NA | NA | NA | NA |

200 GM INK FILTER TIME 0.2 MICRON 60 PSI = 330 SECONDS, VIGOROUS BUBBLE, CLEAN FILTER.
LOADED KORBEL PRINT CARTRIDGE WITH 50 GM INK IMMEDIATELY PRINTED IN XPP4004.
XPP4004 DRY TIME ON COURTLAND 4024DP FELT = 0.3 SECONDS.
RECOVERABILITY AFTER 1 DAY DECAPPED THEN IN XPP4004 BIPASSING LOAD PRIME = IMMEDIATE ALL JETS. NO INK WEEP NOTED.
GOOD SOLID AREA COVERAGE ON XEROX TIJ TRANSPARENCY, SLIGHT CURL OF AIR DRIED SOLID AREA PRINT.

TABLE III

| INGREDIENT/DESCRIPTION | VENDOR | AMOUNT (GM) | SOL N % | MOLE EQV |
|---|---|---|---|---|
| THIODIETHANOL | ALDRICH | 15 | 7.5 | |
| GLYCERINE U.P.S. | BAKER | 8.04 | 4 | |
| DL-1,2-HEXANEDIOL | ALDRICH | 4 | 2 | |
| SURFYNOL 440 SURFACTANT (ETHOXYLATED TETRAMETHYL DECYNEDIOL) | AIR PRODUCTS | 1.04 | 0.5 | |

TABLE III-continued

| INGREDIENT/DESCRIPTION | VENDOR | AMOUNT (GM) | SOL N % | MOLE EQV |
|---|---|---|---|---|
| SWIRL TO MIX ORGANICS, RO WATER | 103 | 159.54 | | NA |
| RO WATER | ALDRICH | 4.01 | 2 | |
| TRIETHANOLAMINE (TEA) | RHONE POLLENC | 1.14 | | |
| pH = 9.99, 70% H3PO3 pH = 7.51 | POLYSCIENCE | 0.061 | 0.03 | NA |
| DOWICIL ROLL MILL 10 MINUTES, HOMOGENEOUS | DOW | 0.1997 | 0.1 | |
| ENOLAN RED EXS (C.I. ACID RED 52) | CIBA-GEIGY | 1.2 | 0.6 | |
| DUASYN BRILLIANT RED F38-SF VP218 (REACTIVE RED 180) | HEOBCHT | 4.48 | 2.25 | 1 |
| ROLL MILL 30 MINUTES, LOW FOAM | NA | NA | NA | NA |
| pH = 7.02, 70% H3POS, pH = 7.51 | RHONE POLLENC | 0.08 | | |
| INK WEIGHT = 198.63 GM, RO WATER TO 200 GM INK, ROLL MILL 10 MIN | 103 | 1.47 | | |
| HOMOGENEOUS, FILTER 0.2 | NA | NA | NA | NA |

200 GM INK FILTER TIME 0.2 MICRON 60 PSI = 5 MINUTES, DRIP TO BUBBLE, CLEAN FILTER.
LOADED KORBEL PRINT CARTRIDGE WITH 45 GM INK IMMEDIATELY PRINTED IN XPP4004.
XPP4004 DRY TIME ON COURTLAND 4024DP FELT = 0.4 SECONDS.
RECOVERABILITY AFTER 3 DAYS DECAPPED THEN IN XPP4004 BIPASSING LOAD PRIME = IMMEDIATE ALL JETS. NO INK WEEP NOTED.
SURFACE TENSION = 27.4, VISCOSITY = 1.63, pH = 7.15

TABLE IV

| INGREDIENT/DESCRIPTION | VENDOR | AMOUNT (GM) | SOL N % | MOLE EQV |
|---|---|---|---|---|
| TRIMETHYLOLPROPANE | ALDRICH | 14.01 | 7 | |
| DL-1,2-HEXANEDIOL | ALDRICH | 4.11 | 2 | |
| SURFYNOL 440 SURFACTANT (ETHOXYLATED TETRAMETHYL DECYNEDIOL) | AIR PRODUCTS | 0.99 | 0.5 | |
| OVEN 60C. FOR 30 MINUTES TO MELT AND MIX ORGANICS | NA | NA | NA | NA |
| RO WATER | 103 | 163.95 | | NA |
| TRIETHANOLAMINE (TEA) | ALDRICH | 4 | 2 | |
| pH = 10.02, 70% H3PO3 pH = 7.53 | RHONE POLLENC | 1.12 | | |
| PEO | POLYSCIENCE | 0.0601 | 0.03 | NA |
| DOWICIL ROLL MILL 10 MINUTES, HOMOGENEOUS | DOW | 0.2009 | 0.1 | |
| NEOLAN RED EXS (C.1 ACID RED 52) | CIBA-GEIGY | 1.2 | 0.6 | |
| DUASYN BRILLIANT RED F38-SF VP218 (REACTIVE RED 180) | HEOBCHT | 4.51 | 2.25 | 1 |
| ROLL MILL 30 MINUTES, LOW FOAM | NA | NA | NA | NA |
| pH = 7.63, 70% H3POS, pH = 7.52 | RHONE POLLENC | 0.07 | | |
| INK WEIGHT = 194.11 GM, RO WATER TO 200 GM INK, ROLL MILL 10 MIN | 103 | 5.89 | | |
| HOMOGENEOUS, FILTER 0.2 | NA | NA | NA | NA |

200 GM INK FILTER TIME 0.2 MICRON 60 PSI = 4 MINUTES, DRIP TO BUBBLE, CLEAN FILTER.
LOADED KORBEL PRINT CARTRIDGE WITH 45 GM INK IMMEDIATELY PRINTED IN XPP4004.
XPP4004 DRY TIME ON COURTLAND 4024DP FELT = 0.3 SECONDS.
RECOVERABILITY AFTER 3 DAYS DECAPPED THEN IN XPP4004 BIPASSING LOAD PRIME = IMMEDIATE ALL JETS. NO INK WEEP NOTED.
GOOD SOLID AREA COVERAGE ON XEROX TIJ TRANSPARENCY, SLIGHT TI CURL OF AIR DRIED SOLID AREA PRINT.
SURFACE TENSION = 27.3, VISCOSITY = 1.55, pH ON = 7.17

TABLE V

| INGREDIENT/DESCRIPTION | VENDOR | AMOUNT (GM) | SOL N % | MOLE EQV |
|---|---|---|---|---|
| SULFOLANTE (97%) | PHILLIPS 66 | 14.4 | 7 | |
| DL-1,2-HEXANEDIOL | ALDRICH | 4 | 2 | |
| SURFYNOL 440 SURFACTANT (ETHOXYLATED TETRAMETHYL DECYNEDIOL) | AIR PRODUCTS | 1.02 | 0.5 | |
| SWIRL TO MIX ORGANICS, RO WATER | 103 | 166.5 | | NA |
| TRIETHANOLAMINE (TEA) | ALDRICH | 4.09 | 2 | |
| pH = 10.23, 70% H3PO3 pH = 7.50 | RHONE POLLENC | 1.25 | | |
| PEO | POLYSCIENCE | 0.0604 | 0.03 | NA |
| DOWICA ROLL MILL 10 MINUTES, HOMOGENEOUS | DOW | 0.1996 | 0.1 | |
| NEOLAN RED EXS (C.I. ACID RED 52) | CIBA-GEIGY | 1.2 | 0.6 | |
| DUASYN BRILLIANT RED F38-SF VP218 (REACTIVE RED 180) | HEOSCHT | 4.52 | 2.25 | 1 |
| ROLL MILL 30 MINUTES, LOW FOAM | NA | NA | NA | NA |

TABLE V-continued

| INGREDIENT/DESCRIPTION | VENDOR | AMOUNT (GM) | SOL N % | MOLE EQV |
|---|---|---|---|---|
| pH = 7.57, 70% H3POS, pH = 7.51 | RHONE POLLENC | 0.05 | | |
| INK WEIGHT = 198.93 GM, RO WATER TO 200 GM INK, ROLL MILL 10 MIN | 103 | 3.07 | | |
| HOMOGENEOUS, FILTER 0.2 | NA | NA | NA | NA |

200 GM INK FILTER TIME 0.2 MICRON 60 PSI = 210 SECONDS, DRIP TO BUBBLE, CLEAN FILTER.
LOADED KORBEL PRINT CARTRIDGE WITH 45 GM INK IMMEDIATELY PRINTED IN XPP4004.
XPP4004 DRY TIME ON COURTLAND 4024DP FELT = 0.3 SECONDS.
RECOVERABILITY AFTER 3 DAYS DECAPPED THEN IN XPP4004 BIPASSING LOAD PRIME = IMMEDIATE ALL JETS. NO INK WEEP NOTED.
GOOD SOLID AREA COVERAGE ON XEROX TIJ TRANSPARENCY, SLIGHT TI CURL OF AIR DRIED SOLID AREA PRINT.
SURFACE TENSION = 27.4, VISCOSITY = 1.34, pH = 7.23

TABLE VI

| INGREDIENT/DESCRIPTION | VENDOR | AMOUNT (GM) | SOL N % | MOLE EQV |
|---|---|---|---|---|
| SULFOLANTE (97%) | PHILLIPS 66 | 14.37 | 7 | |
| 1-CYCLOHEXYL-2-PYRROLIDINONE (CHP) | ALDRICH | 4 | 2 | |
| SURFYNOL 440 SURFACTANT (ETHOXYLATED TETRAMETHYL DECYNEDIOL) | AIR PRODUCTS | 0.99 | 0.5 | |
| RO WATER, ROLL MILL 15 MIN, MILKY SOLUTION | 103 | 159.89 | | NA |
| PEO | POLYSCIENCE | 0.0593 | 0.03 | NA |
| DOWICIL, ROLL MILL 10 MINUTES, MILKY SOLUTION | DOW | 0.2012 | 0.1 | |
| TRIS-(HYDROXYMETHYL) AMINOMETHANE (TRIS, MW = 121) | ALDRICH | 3.28 | 1.62 | |
| pH = 9.93, 70% H3PO3, pH = 7.69 SOLN BECAME MORE CLOUDY AS H3PO3 ADDED | RHONE POLLENC | 1.3 | | |
| NEOLAN RED EXB (C.I. ACID RED 52) | CIBA-GEIGY | 1.22 | 0.6 | |
| DUASYN BRILLIANT RED F3B-SF VP218 (REACTIVE RED 180) | HEOSCHT | 4.49 | 2.25 | 1 |
| ROLL MILL 30 MINUTES, NO FOAM | NA | NA | NA | NA |
| pH = 7.77 | NA | NA | NA | NA |
| INK WEIGHT = 189.57 GM, RO WATER TO 200 GM INK, ROLL MILL 10 MIN | 103 | 10.43 | | |
| HOMOGENEOUS, FILTER 0.2 | NA | NA | NA | NA |

200 GM INK FILTER TIME 0.2 MICRON 60 PSI = 210 SECONDS, VIGOROUS BUBBLE, CLEAN FILTER.
LOADED KORBEL PRINT CARTRIDGE WITH 50 GM INK IMMEDIATELY PRINTED IN XPP4004.
XPP4004 DRY TIME ON COURTLAND 4024DP FELT = 0.4 SECONDS.
RECOVERABILITY AFTER 1 DAY DECAPPED THEN IN XPP4004 BIPASSING LOAD PRIME = IMMEDIATE 110/128 JETS
NO PRINT DEFECTS NOTED. NO INK WEEP NOTED.

TABLE VII

| INGREDIENT/DESCRIPTION | VENDOR | AMOUNT (GM) | SOL N % | MOLE EQV |
|---|---|---|---|---|
| TRIMETHYLOLPROPANE | ALDRICH | 14.01 | 7 | |
| 1-CYCLOHEXYL-2-PYRROLIDINONE (CHP, LESS AMBER COLOR THAN PREV. LOT) | ALDRICH | 4.04 | 2 | |
| SURFYNOL 440 SURFACTANT (ETHOXYLATED TETRAMETHYL DECYNEDIOL) | AIR PRODUCTS | 0.99 | 0.5 | |
| RO WATER, ROLL MILL 15 MIN, MILKY SOLUTION | 103 | 159.97 | | NA |
| PEO | POLYSCIENCE | 0.0607 | 0.03 | NA |
| DOWICIL, ROLL MILL 10 MINUTES, MILKY SOLUTION | DOW | 0.1994 | 0.1 | |
| TRIS-(HYDROXYMETHYL)AMINOMETHANE(TRIS, MW = 121) | ALDRICH | 3.29 | 1.62 | |
| pH = 9.85, 70% H3PO3 pH = 7.65, SOLN BECAME MORE CLOUDY AS H3PO3 ADDED | RHONE POULENIC | 1.29 | | |
| NEOLAN RED EXB (C.I. ACID RED 52) | CIBA-GEIGY | 1.19 | 0.6 | |
| DUASYN BRILLIANT RED F3B-SF VP218 (REACTIVE RED 180) | HEOSCHT | 4.49 | 2.25 | 1 |
| ROLL MILL 30 MINUTES, NO FOAM | NA | NA | NA | NA |
| pH - 7.71 | NA | NA | NA | NA |
| INK WEIGHT = 188.93 GM, RO WATER TO 200 GM INK, ROLL MILL 10 MIN | 103 | 11.07 | | |
| HOMOGENEOUS, FILTER 0.2 | NA | NA | NA | NA |

TABLE VII-continued

| INGREDIENT/DESCRIPTION | VENDOR | AMOUNT (GM) | SOL N % | MOLE EQV |
|---|---|---|---|---|

200 GM INK FILTER TIME 0.2 MICRON 60 PSI = 240 SECONDS, VIGOROUS BUBBLE, CLEAN FILTER.
LOADED KORBEL PRINT CARTRIDGE WITH 50 GM INK IMMEDIATELY PRINTED IN XPP4004.
XPP4004 DRY TIME ON COURTLAND 4024DP FELT = 0.4 SECONDS.
RECOVERABILITY AFTER 1 DAY DECAPPED THEN IN XPP4004 BIPASSING LOAD PRIME = IMMEDIATE 110/128 JETS
NO PRINT DEFECTS NOTED. NO INK WEEP NOTED.

TABLE VIII

| INGREDIENT/DESCRIPTION | VENDOR | AMOUNT (GM) | SOL N % | MOLE EQV |
|---|---|---|---|---|
| SULFOLANTE (97%) | PHILLIPS 66 | 14.4 | 7 | |
| 1-CYCLOHEXYL-2-PYRROLIDINONE (CHP) | ALDRICH | 10.01 | 5 | |
| SURFYNOL 440 SURFACTANT (ETHOXYLATED TETRAMETHYL DECYNEDIOL) | AIR PRODUCTS | 1 | 0.5 | |
| RO WATER, ROLL MILL 15 MIN, MILKY SOLUTION | 103 | 155.23 | | NA |
| PEO | POLYSCIENCE | 0.0608 | 0.03 | NA |
| DOWICIL, ROLL MILL 10 MINUTES, HOMOGENEOUS | DOW | 0.1994 | 0.1 | |
| TRIS-(HYDROXYMETHYL) AMINOMETHANE (TRIS, MW = 121) | ALDRICH | 3.28 | 1.62 | |
| pH = 9.84, 70% H3PO3 pH = 7.65 SOL'N REMAINED HOMOGENEOUS | RHONE POLLENC | 1.29 | | |
| NEOLAN RED EXB (C.I. ACID RED 52) | CIBA-GEIGY | 1.22 | 0.6 | |
| DUASYN BRILLIANT RED F3B-SF VP218 (REACTIVE RED 180) | HEOSCHT | 4.51 | 2.25 | 1 |
| ROLL MILL 30 MINUTES, NO FOAM | NA | NA | NA | NA |
| pH = 7.72 | NA | NA | NA | NA |
| INK WEIGHT = 190.99 GM, RO WATER TO 200 GM INK, ROLL MILL 10 MIN | 103 | 9.01 | | |
| HOMOGENEOUS, FILTER 0.2 | NA | NA | NA | NA |

200 GM INK FILTER TIME 0.2 MICRON 60 PSI = 180 SECONDS, VIGOROUS BUBBLE, CLEAN FILTER.
LOADED KORBEL PRINT CARTRIDGE WITH 50 GM INK IMMEDIATELY PRINTED IN XPP4004.
XPP4004 DRY TIME ON COURTLAND 4024DP FELT = 0.25 SECONDS.
RECOVERABILITY AFTER 1 DAY DECAPPED THEN IN XPP4004 BIPASSING LOAD PRIME = IMMEDIATE 125/128 JETS
NO PRINT DEFECTS NOTED. NO INK WEEP NOTED.

TABLE IX

| INGREDIENT/DESCRIPTION | VENDOR | AMOUNT (GM) | SOL N % | MOLE EQV |
|---|---|---|---|---|
| TRIMETHYLOLPROPANE | ALDRICH | 14 | 7 | |
| 1-CYCLOHEXYL-2-PYRROLIDINONE (CHP, LESS AMBER COLOR THAN PREV. LOT) | ALDRICH | 10.01 | 5 | |
| SURFYNOL 440 SURFACTANT (ETHOXYLATED TETRAMETHYL DECYNEDIOL) | AIR PRODUCTS | 1 | 0.5 | |
| RO WATER, ROLL MILL 15 MIN, MILKY SOLUTION | 103 | 154.9 | | NA |
| PEO | POLYSCIENCE | 0.0605 | 0.03 | NA |
| DOWICIL, ROLL MILL 10 MINUTES, MILKY SOLUTION | DOW | 0.2002 | 0.1 | |
| TRIS-(HYDROXYMETHYL)AMINOMETHANE(TRIS, MW = 121) | ALDRICH | 3.27 | 1.62 | |
| pH = 9.87, 70% H3PO3 pH = 7.70, SOL'N REMAINED CLEAR AS H3PO3 ADDED | RHONE POLLENC | 1.24 | | |
| NEOLAN RED EXB (C.I. ACID RED 52) | CIBA-GEIGY | 1.2 | 0.6 | |
| DUASYN BRILLIANT RED F3B-SF VP218 (REACTIVE RED 180) | HEOSCHT | 4.51 | 2.25 | 1 |
| ROLL MILL 30 MINUTES, NO FOAM | NA | NA | NA | NA |
| pH - 7.78 | NA | NA | NA | NA |
| INK WEIGHT = 190.14 GM, RO WATER TO 200 GM INK, ROLL MILL 10 MIN | 103 | 9.86 | | |
| HOMOGENEOUS, FILTER 0.2 | NA | NA | NA | NA |

200 GM INK FILTER TIME 0.2 MICRON 60 PSI = 240 SECONDS, VIGOROUS BUBBLE, CLEAN FILTER.
LOADED KORBEL PRINT CARTRIDGE WITH 50 GM INK IMMEDIATELY PRINTED IN XPP4004.
XPP4004 DRY TIME ON COURTLAND 4024DP FELT = 0.25 SECONDS.
RECOVERABILITY AFTER 1 DAY DECAPPED THEN IN XPP4004 BIPASSING LOAD PRIME = IMMEDIATE ALL JETS W/O PRINT DEFECTS.
NO INK WEEP NOTED.
NO PRINT DEFECTS NOTED. NO INK WEEP NOTED.

What is claimed is:

1. An ink jet printing composition containing a liquid vehicle and a colorant and a surfactant comprising 0.3 to 0.6 wt. % acetylenic polyalkylene oxide and 1 to 4 wt % quasisurfactant penetrant based on the wt. of said composition.

2. The ink jet printing composition of claim 1, wherein said acetylenic polyalkylene oxide is:

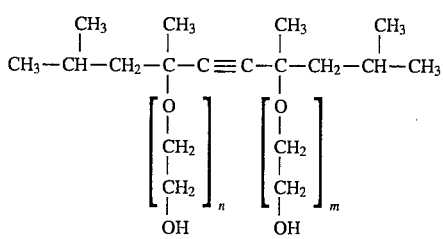

where n+m=0 to 50.

3. The ink jet printing composition of claim 1, wherein said acetylenic polyalkylene oxide is an ethoxylated tetramethyl decynediol.

4. The ink jet printing composition of claim 1, wherein said quasisurfactant penetrant is selected from the group consisting of dl-1,2-hexanediol, 1,2-octanediol, diethylene glycol monobutyl ether, 1-cyclohexyl-2-pyrrolidinone and 2-methyl-2-propyl-1-3-propanediol and 1-butanesulfonic acid sodium salt.

5. The ink jet printing composition of claim 1, wherein said quasisurfactant is 1,2-hexanediol.

6. The ink jet printing composition of claim 3, wherein said quasisurfactant is 1,2-hexanediol.

7. An ink jet printing process, comprising causing an ink jet composition containing a surfactant comprising 0.3 to 6 wt. % acetylenic polyalkylene oxide and 1 to 4 wt. % quasisurfactant penetrant based on the wt. of said composition to be ejected in an imagewise fashion from a thermal ink jet printer onto a substrate.

8. The ink jet printing process of claim 7, wherein said acetylenic polyalkylene oxide is:

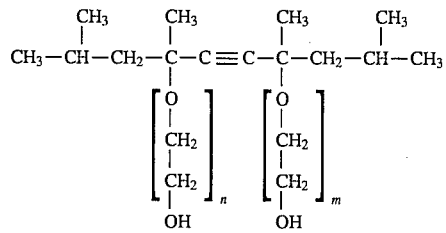

where n+m=0 to 50.

9. The ink jet printing process of claim 7, wherein said acetylenic polyalkylene oxide is an ethoxylated tetramethyl decynediol.

10. The ink jet printing process of claim 7, wherein said quasisurfactant penetrant is selected from the group consisting of dl-1,2-hexanediol, 1,2-octanediol, diethylene glycol monobutyl ether, 1-cyclohexyl-2-pyrrolidinone and 2-methyl-2-propyl-1,3-propanediol and 1-butanesulfonic acid sodium salt.

11. The ink jet printing process of claim 7, wherein said quasisurfactant is 1,2-hexanediol.

12. A method of improving the fast dry characteristics of ink jet inks, comprising incorporating into a thermal ink jet ink composition, a surfactant comprising 0.3 to 6 wt. % acetylenic polyalkylene oxide and 1 to 4 wt. % quasisurfactant penetrant based on the wt. of said composition.

13. The method of claim 12, wherein said acetylenic polyalkylene oxide is:

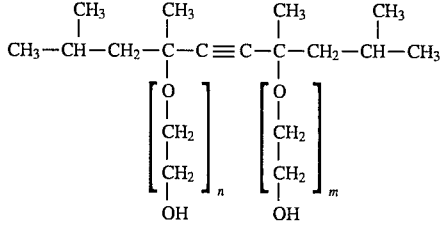

where n+m=0 to 50.

14. The method of claim 12, wherein said acetylenic polyalkylene oxide is an ethoxylated tetramethyl decynediol.

15. The method of claim 12, wherein said quasisurfactant penetrant is selected from the group consisting of dl-1,2-hexanediol, 1,2-octanediol, diethylene glycol monobutyl ether, 1-cyclohexyl-2-pyrrolidinone and 2-methyl-2-propyl-1,3-propanediol and 1-butanesulfonic acid sodium salt.

16. The method of claim 12, wherein said quasisurfactant is 1,2-hexanediol.

* * * * *